US012485678B2

(12) United States Patent
Nishimura

(10) Patent No.: US 12,485,678 B2
(45) Date of Patent: Dec. 2, 2025

(54) PRINTER

(71) Applicant: Toshiba Tec Kabushiki Kaisha, Tokyo (JP)

(72) Inventor: Yosuke Nishimura, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 18/362,681

(22) Filed: Jul. 31, 2023

(65) Prior Publication Data

US 2025/0042176 A1 Feb. 6, 2025

(51) Int. Cl.
*B41J 2/325* (2006.01)
*B41J 33/34* (2006.01)

(52) U.S. Cl.
CPC ............... *B41J 2/325* (2013.01); *B41J 33/34* (2013.01)

(58) Field of Classification Search
CPC .................................. B41J 2/325; B41J 33/34
See application file for complete search history.

(56) References Cited

U.S. PATENT DOCUMENTS 10,647,139 B1 * 5/2020 Kitahara .................. B41J 33/24

FOREIGN PATENT DOCUMENTS

| | | | |
|---|---|---|---|
| JP | H082078 | A | 1/1996 |
| JP | 2008-137318 | A | 6/2008 |
| JP | 2013-199049 | A | 10/2013 |

* cited by examiner

*Primary Examiner* — Kristal Feggins
(74) *Attorney, Agent, or Firm* — FOLEY & LARDNER LLP

(57) ABSTRACT

A printing apparatus includes a feed side roll, a winding roller, a driver, a detector, a printer, a conveyance roller, and an adjuster. The feed side roll includes an ink ribbon wound on a feeding roller. The driver rotates the winding roller in a direction of winding the ink ribbon. The detector detects a change in a tension of the ink ribbon being wound. The printer prints on a print medium via the ink ribbon stretched in a tense state between a collection side roll where the ink ribbon is wound and the feed side roll. The conveyance roller winds the ink ribbon between the collection side roll and the printer. The adjuster adjusts a torque for rotating the winding roller by the driver based on detection results by the detector to keep a tension of the ink ribbon passing through the printer constant.

18 Claims, 4 Drawing Sheets

PRINTER

FIELD

Embodiments described herein relate generally to a printer that prints on a printed medium using an ink ribbon wound in a roll.

BACKGROUND

In a ribbon transfer type printer that may be used in the workplace, the ink ribbon and the printed medium are overlapped and conveyed between the thermal head and the platen roller, and the ink of the ink ribbon is transferred to the printed medium. This type of printer winds up the used ink ribbon by the winding shaft, so that the diameter of the collecting roll increases over time. When the winding shaft is rotated with a constant torque, as the diameter of the collecting roll increases, the tension of the ink ribbon between the thermal head and the collecting roll is weakened, which may adversely affect the quality of printing.

DETAILED DESCRIPTION

Figure 1:
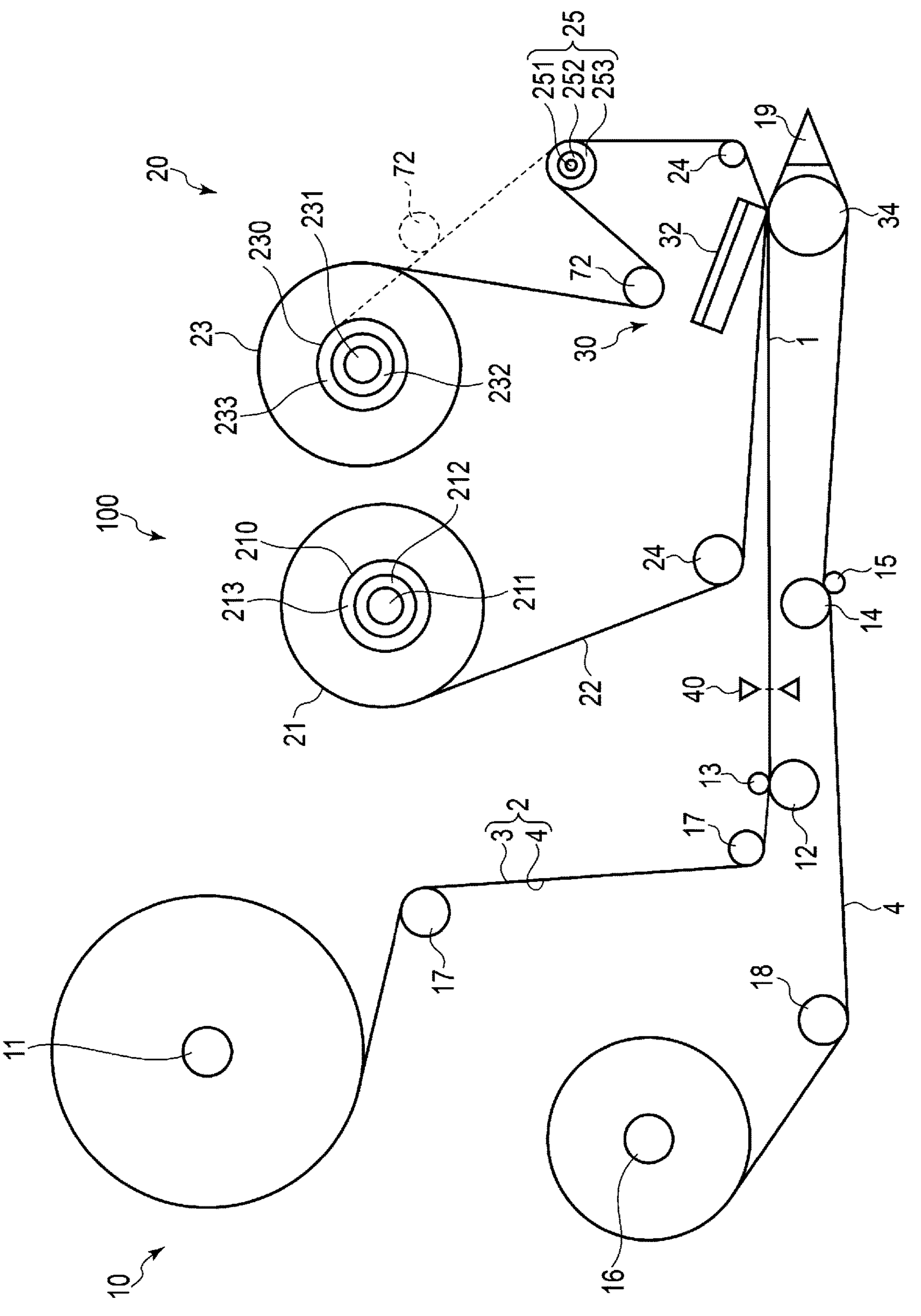
FIG. 1 is a schematic diagram illustrating a printer according to one embodiment.

In general, according to one embodiment, the printer includes a feed side roll, a winding roller, a drive unit (e.g., a driver, etc.), a detection unit (e.g., a detector, etc.), a printing unit (e.g., a printer, print device, print apparatus, etc.), a conveyance roller, and an adjustment unit (e.g., an adjuster, etc.). The feed side roll includes a feeding roller in which an ink ribbon is wound. The winding roller winds the ink ribbon fed from the feed side roll. The driver rotates the winding roller in a direction of winding the ink ribbon. The detection unit detects a change in a tension of the ink ribbon being wound by the winding roller. The printing unit prints on a printed medium via the ink ribbon stretched in a tense state between a collection side roll in which the ink ribbon is wound by the winding roller and the feed side roll. The conveyance roller winds the ink ribbon between the collection side roll and the printing unit and rotates in the direction of winding the ink ribbon. The adjustment unit adjusts a torque for rotating the winding roller by the drive unit based on detection results in the detection unit, and keeps a tension of the ink ribbon passing through the printing unit constant.

Hereinafter, a printer apparatus 100 according to one embodiment will be described with reference to the drawings. In the drawings used for the description of the following embodiments, the scale of each part may be changed as appropriate. Further, in the drawings used for the description of the following embodiments, the configuration may be omitted in order to make the description easier to understand.

As illustrated in FIG. 1, the printer apparatus 100 includes a label conveyance unit (e.g., label conveyor, etc.) 10, a ribbon conveyance unit (e.g., ribbon conveyor, etc.) 20, and a printing unit (e.g., printer, printing device, etc.) 30. The label conveyor 10 is an example of the “conveyance unit” described in the claims of the present application, and conveys a label paper 2 via a conveyance path 1. The ribbon conveyor 20 conveys an ink ribbon 22 with which the label paper 2 is overlapped. The printing unit 30 prints on a label 3 of the label paper 2 via the ink ribbon 22. The printer apparatus 100 includes a frame or housing (not illustrated) to which the components of the label conveyor 10, the ribbon conveyor 20, and the printing unit 30 are attached in a predetermined positional relationship.

The label paper 2 is configured with the label 3 having a plurality of rectangular sheets attached to one surface of a mount 4 having a strip-shaped at equal intervals with a gap of 1 to 3 mm therebetween. The label 3 has a constant length along a longitudinal direction of the mount 4. The label 3 has a width slightly shorter than a width orthogonal to the longitudinal of the mount 4. The label 3 includes an adhesive layer on an adhesive surface between the label 3 and the mount 4 to enable the label 3 to be peeled off from the mount 4 and to be attached to other articles after being peeled off from the mount 4. The label 3 is an example of the “printed medium” described in the claims of the present application.

The label conveyor 10 includes a feeding roller 11 in which the label paper 2 is wound in a roll shape, a winding roller 16 that winds the mount 4 in a roll shape after the label 3 is peeled off, and a peeling guide 19. In the feeding roller 11, the label paper 2 is wound in a direction that the label 3 is inside the mount 4.

The label conveyor 10 includes the conveyance path 1 for conveying the label paper 2 pulled out from the feeding roller 11. The label conveyor 10 includes a capstan roller 12 on the lower surface side of the conveyance path 1 between the feeding roller 11 and the printing unit 30 in the drawing, that is, on the rear surface side of the mount 4 of the label paper 2 that is conveyed through the conveyance path 1. A pinch roller 13 is at a position facing the capstan roller 12 across the conveyance path 1, that is, on the label 3 side. The pinch roller 13 is pressed against the capstan roller 12 by a spring (not illustrated) or the like, with the label paper 2 sandwiched therebetween. The capstan roller 12 rotates in a clockwise direction in FIG. 1 to pull out the label paper 2 sandwiched between the capstan roller 12 and the pinch roller 13 from the feeding roller 11.

The label conveyor 10 includes a peeling roller 14 between the printing unit 30 and the winding roller 16. The peeling roller 14 conveys the mount 4 after the label 3 is peeled off by the peeling guide 19. A pinch roller 15 is at a position facing the peeling roller 14 with the mount 4 sandwiched therebetween. The pinch roller 15 is pressed against the peeling roller 14 by a spring or the like (not illustrated) with the mount 4 sandwiched therebetween. The peeling roller 14 rotates in the clockwise direction in FIG. 1 to convey the mount 4 folded back by the peeling guide 19 toward the winding roller 16.

The peeling guide 19 is on the right side of a platen roller 34 in the drawing, that is, a side opposite to the capstan roller 12 and the peeling roller 14 with respect to the platen roller 34. The peeling guide 19 is fixed to a frame of the printer apparatus 100. The peeling guide 19 has a corner portion with an acute angle. The peeling guide 19 slidingly contacts the corner portion to a surface opposite to a surface to which the label 3 of the label paper 2 pulled out by the capstan roller 12 is attached, and folds the label paper 2 back about 180° in the opposite direction (left direction in the drawing). The peeling guide 19 peels off the printed label 3 from the mount 4 of the label paper 2 conveyed by the peeling roller 14. The peeling guide 19 peels off the label 3 from the mount 4 by the nature of the label 3 that does not try to bend together with the mount 4. In the vicinity of the peeling guide 19, there is a label processing device (not illustrated) that receives and processes the label 3 peeled off from the mount 4.

In addition to this, the label conveyor 10 includes two rollers 17 supporting the label paper 2 between the feeding roller 11 and the capstan roller 12, and one roller 18 supporting the mount 4 between the peeling roller 14 and the winding roller 16. These rollers 17 and 18 are driven to rotate by the label paper 2 being conveyed.

The plurality of rollers 11 to 18 of the label conveyor 10 each have a rotation shaft (not illustrated) extending in a direction perpendicular to a paper surface in FIG. 1. The frame of the printer apparatus 100 rotatably supports both ends of the rotation shafts of the plurality of rollers 11 to 18. The frame of the printer apparatus 100 supports a conveyance motor 64 (FIG. 4) of the label conveyor 10 described later.

The label conveyor 10 conveys the label paper 2 via the conveyance path 1 in cooperation with the platen roller 34 of the printing unit 30 described later. The conveyance path 1 passes between a thermal head 32 of the printing unit 30 described later and the platen roller 34. The platen roller 34 of the printing unit 30 contacts the label paper 2 and rotates in the clockwise direction in FIG. 1 to apply a conveying force to the label paper 2. The label conveyor 10 conveys the label paper 2 in an orientation where the surface to which the label 3 of the mount 4 is attached faces the thermal head 32 of the printing unit 30.

The printer apparatus 100 includes a sensor 40 in the middle of the conveyance path 1 on the upstream side of the printing unit 30 along a conveyance direction of the label paper 2. The sensor 40 detects a gap between two adjacent labels 3 along the conveyance direction of the label paper 2 conveyed by the label conveyor 10. The sensor 40 is, for example, a transmission sensor having a light emitting unit (e.g., light emitter, light emitting device, etc.) and a light receiving unit (e.g., light receiver, light receiving device, etc.) disposed across the conveyance path 1. The sensor 40 is at a position where light incident from the light emitter to the light receiver crosses the conveyance path 1 between the capstan roller 12 and the printing unit 30. The sensor 40 measures an intensity of the light transmitted through the label paper 2 conveyed through the conveyance path 1, and detects the peak of the intensity as the center (center of the gap) of only the portion of the mount 4 between two consecutive labels 3.

The ribbon conveyor 20 includes a feed side roll 21 in which the long ink ribbon 22 is wound around a feeding roller 210, and a collection side roll 23 in which the used ink ribbon 22 passing through the printing unit 30 is wound by a winding roller 230. The ink ribbon 22 stretched in a tense state between the feed side roll 21 and the collection side roll 23 passes between the thermal head 32 and the platen roller 34 of the printing unit 30 so as to sequentially overlap the plurality of labels 3 of the label paper 2 conveyed through the conveyance path 1. The label paper 2 and the ink ribbon 22 are conveyed in the same direction at the same conveying speed and pass through the printing unit 30.

In addition to this, the ribbon conveyor 20 includes two rollers 24 supporting the ink ribbon 22, and a conveyance roller 25 that applies the conveying force to the ink ribbon 22 on a downstream side of the printing unit 30 described later. The conveyance roller 25 winds the ink ribbon 22 between the collection side roll 23 and the printing unit 30 at a predetermined angle, and rotates in the direction of winding the ink ribbon 22 by the winding roller 230. By changing an amount of the ink ribbon 22 wound around the conveyance roller 25 by an adjustment mechanism 70 (FIG. 2) described later, a contact area with the ink ribbon 22 can be changed and the conveying force applied to the ink ribbon 22 can be changed.

The feeding roller 210 includes a drive shaft 211 extending in the direction perpendicular to the paper surface in FIG. 1 and an outer side roller 213 provided on the drive shaft 211 via a torque limiter 212. In the feeding roller 210, the ink ribbon 22 is wound on the outside of the outer side roller 213. The winding roller 230 includes a drive shaft 231 extending in the direction perpendicular to the paper surface in FIG. 1 and an outer side roller 233 provided on the drive shaft 231 via a torque limiter 232. The winding roller 230 winds and collects the used ink ribbon 22 on the outside of the outer side roller 233.

The conveyance roller 25 includes a drive shaft 251 extending in a direction perpendicular to the paper surface in FIG. 1 and an outer side roller 253 provided on the drive shaft 251 via a torque limiter 252. In the conveyance roller 25, the ink ribbon 22 is wound on an outer peripheral surface of the outer side roller 253. The two rollers 24 include rotation shafts extending in the direction perpendicular to the paper surface in FIG. 1. The two rollers 24 are driven to rotate by the ink ribbon 22.

Figure 4:
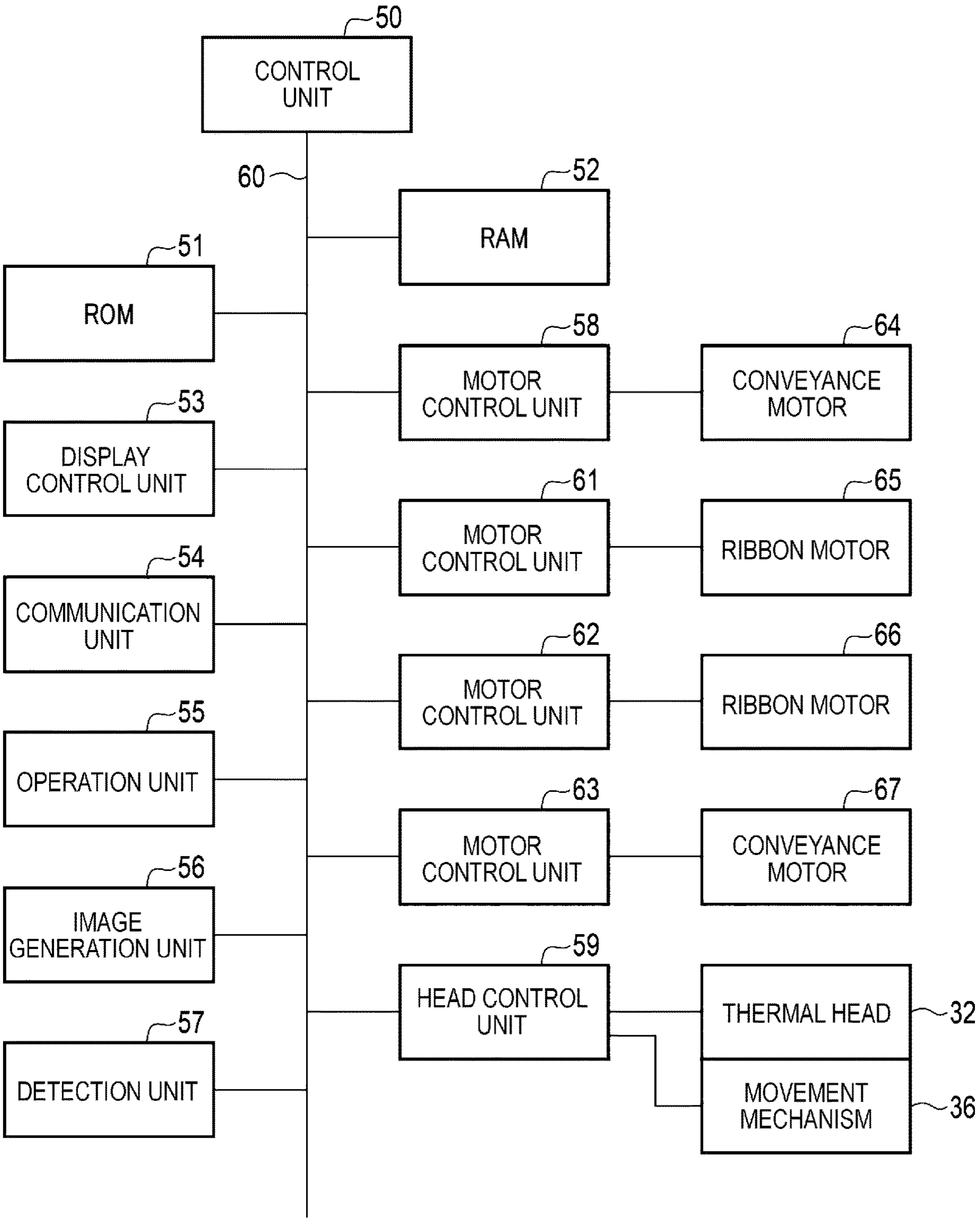
FIG. 4 is a block diagram illustrating a control system according to one embodiment.

The frame of the printer apparatus 100 rotatably supports both ends of the drive shaft 211 of the feeding roller 210, both ends of the drive shaft 231 of the winding roller 230, both ends of the drive shaft 251 of the conveyance roller 25, and both ends of the respective rotation shafts of the two rollers 24. The frame of the printer apparatus 100 supports ribbon motors 65 and 66 of the ribbon conveyor 20 and a conveyance motor 67 (FIG. 4).

The ribbon motor 65 rotates the drive shaft 211 of the feeding roller 210. The ribbon motor 66 rotates the drive shaft 231 of the winding roller 230. The ribbon motors 65 and 66 are examples of the "driver" or "drive unit" described in the claims of the present application, and rotate the feeding roller 210 and the winding roller 230 synchronously. The conveyance motor 67 is an example of "driver" or "another drive unit" described in the claims of the present application, and rotates the drive shaft 251 of the conveyance roller 25.

As the ribbon motor 66 that rotates the drive shaft 231 of the winding roller 230, a DC motor can be used in which a torque that rotates the drive shaft 231 can be changed by changing a current value applied to a motor. The torque value changed by the ribbon motor 66 is less than a limit value due to the torque limiter 232 of the winding roller 230. As the conveyance motor 67, a stepping motor can be used in which the drive shaft 251 rotates with a constant torque.

The torque limiter 212 of the feeding roller 210 suppresses a torque for rotating the outer side roller 213 to less than a predetermined torque, and limits a torque applied from the ribbon motor 65 to the outer side roller 213 to less than a predetermined value. The torque limiter 232 of the conveyance roller 230 suppresses a torque for rotating the outer side roller 233 to less than a predetermined torque, and limits a torque applied from the ribbon motor 66 to the outer side roller 233 to less than a predetermined value. The torque limiter 252 of the conveyance roller 25 suppresses a torque for rotating the outer side roller 253 to less than a predetermined torque, and limits a torque applied from the conveyance motor 67 to the outer side roller 253 to less than a predetermined value.

Figure 2:
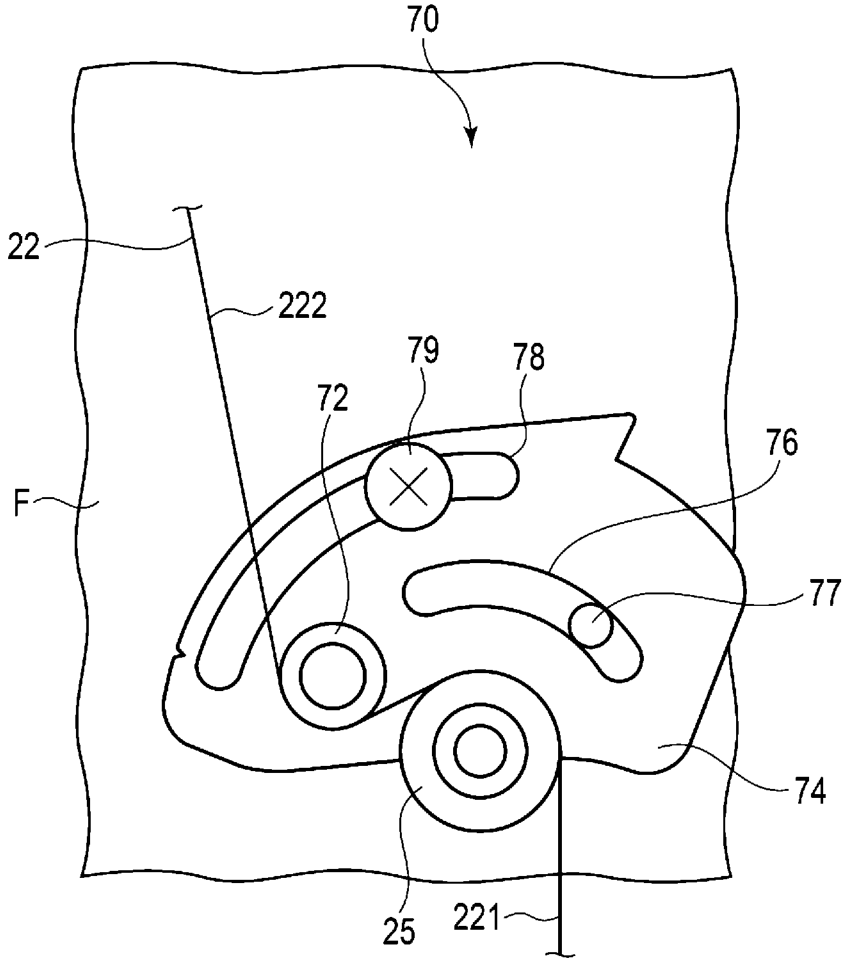
FIG. 2 is a schematic diagram illustrating an example of an adjustment mechanism according to one embodiment.

As illustrated in FIG. 2, the ribbon conveyance unit 20 includes the adjustment mechanism (e.g., adjuster, etc.) 70 that adjusts the amount of the ink ribbon 22 wound around the conveyance roller 25. The adjustment mechanism 70 is an example of "an adjuster" or "another adjustment unit" described in the claims of the present application. The adjustment mechanism 70 includes a winding rod 72 for winding the ink ribbon 22 around the conveyance roller 25. The winding rod 72 is cylindrical with a shaft perpendicular to the paper surface. The winding rod 72 may be a roller that rotates as the ink ribbon 22 runs. The winding rod 72 is at a position pressing the ink ribbon 22 stretched in a tense state between the conveyance roller 25 and the collection side roll 23. The winding rod 72 is on a side opposite to the conveyance roller 25 with the ink ribbon 22 sandwiched therebetween. The adjustment mechanism 70 includes a holding member 74 to which the winding rod 72 is fixed.

The winding rod 72 brings the outer peripheral surface into contact with a surface 222 opposite to a surface 221 where the conveyance roller 25 comes into contact with the ink ribbon 22. The adjustment mechanism 70 presses the surface 222 of the ink ribbon 22 with the winding rod 72 to adjust the amount of the ink ribbon 22 wound around the conveyance roller 25. For example, the winding rod 72 can be moved between a position indicated by a dashed line and a position indicated by a solid line in FIG. 1. The amount of the ink ribbon 22 wound around the winding rod 72 can be considered by replacing the amount of the wound ink ribbon 22 with the area of the portion where the surface 222 of the ink ribbon 22 comes into contact with the outer peripheral surface of the outer side roller 253 of the conveyance roller 25.

For example, as indicated by the solid line in FIG. 1, when the amount of the ink ribbon 22 wound around the conveyance roller 25 is increased, a contact area between the outer peripheral surface of the outer side roller 253 of the conveyance roller 25 and the ink ribbon 22 increases, a friction force between the outer side roller 253 of the conveyance roller 25 and the ink ribbon 22 increases, and the conveying force applied to the ink ribbon 22 by the conveyance roller 25 becomes larger. Further, as indicated by the dashed line in FIG. 1, when the amount of the ink ribbon 22 wound around the conveyance roller 25 is reduced, the contact area between the outer peripheral surface of the outer side roller 253 of the conveyance roller 25 and the ink ribbon 22 decreases, the friction force between the outer side roller 253 of the conveyance roller 25 and the ink ribbon 22 decreases, and the conveying force applied to the ink ribbon 22 by the conveyance roller 25 becomes smaller.

As an example, the holding member 74 is attached to a frame F of the printer apparatus 100 to be rotatable coaxially with the conveyance roller 25. The rotation center of the holding member 74 does not necessarily need to be provided coaxially with the conveyance roller 25. In other embodiments, the holding member 25 is not rotatable coaxially with the conveyance roller 25. The winding rod 72 fixed to the holding member 74 is parallel to a rotation shaft of the holding member 74. The holding member 74 has two arc-shaped cam holes 76 and 78 provided through the holding member 74 coaxially with the rotation shaft. A cam pin 77 is inserted in the cam hole 76 and protrudes outward from the frame F toward the holding member 74. A screw 79 is secured (e.g., screwed, etc.) to the frame F. The screw 79 is fixes the holding member 74 to the frame F. The shape of the holding member 74 may be any shape, and is not limited to the shape illustrated.

When the holding member 74 is rotated in a counterclockwise direction in FIG. 2, the winding rod 72 swings in the counterclockwise direction around the conveyance roller 25 (as shown in the FIGS.) and moves in a direction such that the surface 222 presses on the ink ribbon 22. For example, this direction is a direction from the position indicated by the dashed line toward the position indicated by the solid line of the winding rod 72 in FIG. 1. Since the winding rod 72 presses the surface 222 opposite to the conveyance roller 25, when the winding rod 72 swings in the counterclockwise direction, the amount of the ink ribbon 22 wound around the conveyance roller 25 increases.

Conversely, when the winding rod 72 swings in the clockwise direction, the amount of the ink ribbon 22 wound around the conveyance roller 25 is reduced. For example, this direction is a direction from the position indicated by the solid line toward the position indicated by the dashed line of the winding rod 72 in FIG. 1. The holding member 74 can be fixed to the frame F by the screw 79 in a state where the holding member 74 is rotated to a rotation position that results in a desired amount of the ink ribbon 22 wound around the conveyance roller 25. The holding member 74 may be controlled so that the holding member 74 is rotated by a motor or the like to be arranged at a desired rotation position.

Figure 3:
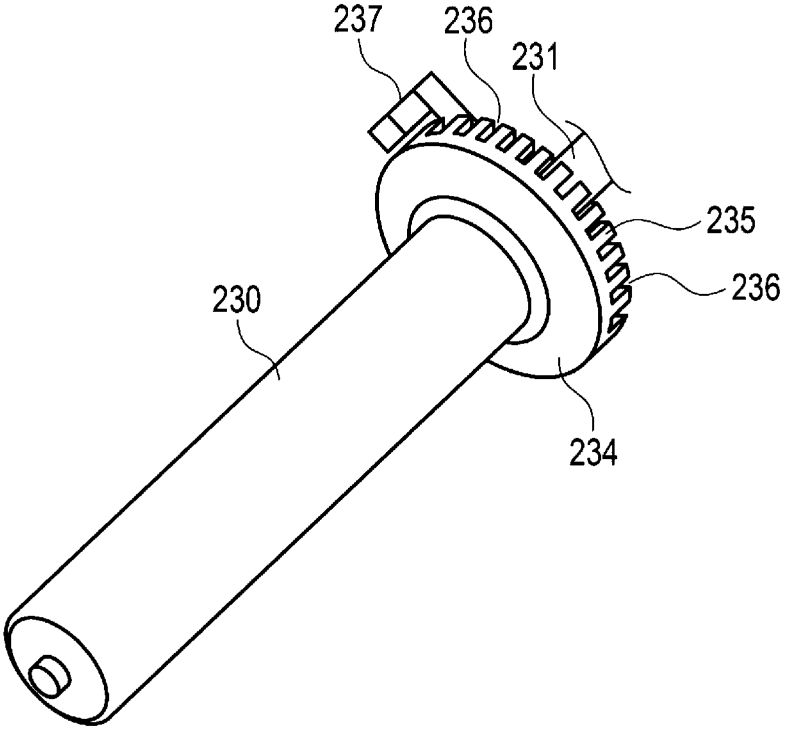
FIG. 3 is a diagram illustrating a configuration for detecting a diameter of a collection side roll according to one embodiment.

As illustrated in FIG. 3, the winding roller 230 has a cylindrical member 234 coaxially fixed to one end of the drive shaft 231. The cylindrical member 234 includes a plurality of notches 236 of the same shape throughout the entire circumference of a peripheral wall 235. In the vicinity of the cylindrical member 234, there is a photosensor 237 for detecting the plurality of notches 236. The photosensor 237 has a light emitting unit (e.g., a light emitter, etc.) and a light receiving unit (e.g., a light receiver, etc.) so that the peripheral wall 235 of the cylindrical member 234 is sandwiched therebetween, and the optical axis of the light beam emitted from the light emitter and received by the light receiver is disposed at a position passing through the plurality of notches 236 in the rotating cylindrical member 234.

Referring back to FIG. 1, the printing unit 30 of the printer apparatus 100 includes the thermal head 32 and the platen roller 34. The printing unit 30 includes the thermal head 32 at a position where the label paper 2 and the ink ribbon 22 are sandwiched (e.g., adjacent to, above and below, in confronting relation to, etc.) between the thermal head 32 and the rear surface side of the ink ribbon 22, that is, the platen roller 34. The platen roller 34 is at a position facing the thermal head 32 with the label paper 2 and the ink ribbon 22 in the overlapped state sandwiched therebetween.

The thermal head 32 includes a plurality of heat generating elements (not illustrated) disposed in the direction perpendicular to the paper surface in FIG. 1 on the platen roller 34 side. The thermal head 32 brings the plurality of heat generating elements into contact with the rear surface of the ink ribbon 22 while moving to the printing position (as shown in the FIGS.), and sandwiches the ink ribbon 22 and the label paper 2 between the thermal head 32 and the platen roller 34. The platen roller 34 applies the conveying force to the label paper 2 by sandwiching and rotating the label paper 2 between the thermal head 32 and the platen roller 34. The printing unit 30 presses the ink ribbon 22 to the label paper 2 by the thermal head 32, heats the ink ribbon 22 with the plurality of heat generating elements, and performs printing on the print region of the label 3 of the label paper 2.

The printer apparatus 100 has a movement mechanism (e.g., a movement, etc.) 36 (FIG. 4) that detaches the thermal head 32 from the platen roller 34. The movement mechanism 36 moves the thermal head 32 between the printing position (position illustrated in FIG. 1) where the thermal head 32 is pressed against the platen roller 34 and the non-printing position (not illustrated) where the thermal head 32 is separated (e.g., a distance away from, etc.) from the ink ribbon 22. When the thermal head 32 is moved to the non-printing position, the thermal head 32 separates from the ink ribbon 22, and the force for sandwiching the label paper 2 and the ink ribbon 22 between the platen roller 34 and the thermal head 32 is also lost. For this reason, when the thermal head 32 is moved to a non-printing position, the conveying force applied from the platen roller 34 to the label paper 2 is almost eliminated.

As illustrated in FIG. 4, the printer apparatus 100 includes a control unit (e.g., controller, etc.) 50, a ROM 51, a RAM 52, a display control unit (e.g., display controller, etc.) 53, a communication unit (e.g., communicator, etc.) 54, an operation unit (e.g., operator, etc.) 55, an image generation unit (e.g., image generator, etc.) 56, a detection unit (e.g., detector, etc.) 57, a motor control unit (e.g., a first motor controller, etc.) 58, a motor control unit (e.g., a second motor controller, etc.) 61, a motor control unit (e.g., a third motor controller, etc.) 62, a motor control unit (e.g., a fourth motor controller, etc.) 63, a head control unit (e.g., head controller, etc.) 59, the conveyance motor 64, the ribbon motor 65, the ribbon motor 66, the conveyance motor 67, the thermal head 32, and the movement mechanism 36. A bus line 60 is communicably connected to the control unit 50, the ROM 51, the RAM 52, the display control unit 53, the communication unit 54, the operation unit 55, the image generation unit 56, the detection unit 57, the motor control unit 58, the motor control unit 61, the motor control unit 62, the motor control unit 63, and the head control unit 59. The control unit 50 is an example of the "adjuster" or "adjustment unit".

The control unit 50 includes a CPU that controls the operation of the printer apparatus 100. The ROM 51 stores operation information, setting information, operation programs, and the like. The RAM 52 stores various processing information. The display control unit 53 controls the display unit (e.g., display, screen, etc.) in the control panel (not illustrated) of the printer apparatus 100. The communication unit 54 communicates with a host computer or the like provided externally, and acquires information of the print data as a print command, for example. The operation unit 55 is, for example, located on the control panel and includes various input keys for the operator to manually input data. The image generation unit 56 draws print data to be printed on the label 3 such as a two-dimensional barcode or a character in a buffer.

The motor control unit 58 controls the capstan roller 12 of the label conveyance unit 10, the peeling roller 14, and the transfer motor 64 that rotatably drives the platen roller 34. The conveyance motor 64 applies a driving force to the rotation shafts of the three rollers 12, 14, and 34 via belts and pulleys (not illustrated). For example, the conveyance motor 64 synchronously rotates the three rollers 12, 14, and 34.

The motor control unit 61 controls the ribbon motor 65 that rotatably drives the feeding roller 210. The motor control unit 62 controls the ribbon motor 66 that rotatably drives the winding roller 230. The motor control unit 62 changes the current value applied to the ribbon motor 66 according to detection results in the detection unit 57. The motor control unit 63 controls the ribbon motor 67 that rotatably drives the conveyance roller 25.

The head control unit 59 controls the movement mechanism 36 to move the thermal head 32 between the printing position and the non-printing position. Further, the head control unit 59 controls the heat generation state of the heat generating element of the thermal head 32.

The detection unit 57 detects the rotational speed of the winding roller 230 of the ribbon conveyance unit 20 based on the output of the photosensor 237 described above, calculates a diameter of the collection side roll 23, and detects a change in the calculated diameter of the collection side roll 23 as a change in a tension of the ink ribbon 22. The diameter of the collection side roll 23 can be calculated by the following equation (1).

When the angular velocity of the winding roller 230 is ω [rad/see], the rotation time of the winding roller 230 is t [sec], a diameter of the winding roller 230 is r [mm], a thickness of the ink ribbon 22 is s [mm], and a coefficient considering the expansion and contraction of the ink ribbon 22 is k, a diameter R of the collection side roll 23 can be expressed by the following equation (1).

$$R=k(\omega t/2\pi)+r \quad (1)$$

As the diameter of the collection side roll 23 increases over time due to the winding of the used ink ribbon 22, the tension of the ink ribbon 22 being wound by the winding roller 230 decreases. Therefore, the detection unit 57 can detect a change in the tension of the ink ribbon 22 being wound by the winding roller 230 by detecting the diameter of the collection side roll 23.

In other words, the detection unit 57 may be any unit (e.g., device, structure, etc.) capable of detecting a change in the tension of the ink ribbon 22 being wound by the winding roller 230. For example, the detection unit 57 may be a detection mechanism (e.g., detecting method, etc.) that directly detects the tension of the ink ribbon 22 being wound by the winding roller 230. Alternatively, the detection unit 57 may detect slippage between the conveyance roller 25 and the ink ribbon 22 when the pitch of the label 3 detected by the sensor 40 in the label conveyance unit 10 is longer than a predetermined threshold value, and detect that the tension of the ink ribbon 22 being wound by the winding roller 230 drops beyond a predetermined threshold value.

Hereinafter, the functions of the ribbon conveyance unit 20 described above will be described.

As described above, when the used ink ribbon 22 is wound by the winding roller 230, the diameter of the collection side roll 23 gradually increases. For this reason, when the winding roller 230 is rotated at a constant torque, the tension of the ink ribbon 22 being wound by the winding roller 230 gradually decreases as the diameter of the collection side roll 23 increases. When the tension of the ink ribbon 22 decreases, the quality of printing in the printing unit 30 may be adversely affected.

Therefore, in the present embodiment, the diameter of the collection side roll 23 is calculated in the detection unit 57 to detect changes in the tension of the ink ribbon 22, and based on this detection, the torque applied to the drive shaft 231 of the winding roller 230 is adjusted so that the tension of the ink ribbon 22 passing through the printing unit 30 remains constant (e.g., substantially the same, etc.).

In this case, the control unit 50 queries the diameter of the collection side roll 23 calculated using the above-described equation (1) in the detection unit 57 to the control table prepared in advance in the RAM 52, and a current value that generates the optimum torque according to the diameter of the collection side roll 23 is obtained, and a current of this current value is applied to the ribbon motor 66. Thereby, regardless of the diameter of the collection side roll 23, the tension of the ink ribbon 22 can always be controlled constantly.

The control table stored in RAM 52 is, for example, the one that divides the change in the diameter of the collection side roll 23 into a plurality of stages, and the current value applied to the ribbon motor 66 that can keep the tension of the ink ribbon 22 constant at each stage of diameter is measured in advance.

As described above, the ribbon motor 66 is a DC motor that can change the torque applied to the drive shaft 231, so that the tension of the ink ribbon 22 passing through the printing unit 30 causes a slight variation. For this reason, in the present embodiment, the conveyance roller 25 torque-limited by the torque limiter 252 is arranged on the downstream side of the printing unit 30 to reduce variations in tension. At this time, the conveying force applied to the ink ribbon 22 by the conveyance roller 25 can be adjusted to a desired conveying force by adjusting the amount of the ink ribbon 22 wound around the conveyance roller 25 by the adjustment mechanism 70.

As described above, according to the embodiment described above, the current value applied to the ribbon motor 66 is adjusted as the diameter of the collection side roll 23 increases, and the tension variation of the ink ribbon 22 is reduced by the conveyance roller, and thus, the tension of the ink ribbon 22 passing through the thermal head 32 can always be constant and the quality of printing can be maintained well.

Further, according to the present embodiment, when the diameter of the collection side roll 23 is small and the tension of the ink ribbon 22 being wound by the winding roller 230 is sufficiently large, a current value for rotating the ribbon motor 66 is reduced, thereby reducing the problem that too strong tension of the ink ribbon 22 causes wrinkles in the ink ribbon 22.

While certain embodiment has been described, this embodiment has been presented by way of example only, and is not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A printer apparatus comprising:

a feed side roll including an ink ribbon wound around a feeding roller;

a winding roller that winds the ink ribbon fed from the feed side roll;

a first driver configured to rotate the winding roller in a direction of winding the ink ribbon;

a detector configured to detect a change in a tension of the ink ribbon being wound by the winding roller, wherein the detector is configured to include a sensor that detects a rotational speed of the winding roller, and to calculate a diameter of a collection side roll based on the rotational speed detected by the sensor;

a printer configured to print on a printed medium via the ink ribbon stretched in a tense state between the collection side roll in which the ink ribbon is wound by the winding roller and the feed side roll;

a conveyance roller that winds the ink ribbon between the collection side roll and the printer, and rotates in the direction of winding the ink ribbon; and a first adjuster configured to adjust a torque for rotating the winding roller by the first driver based on detection results in the detector, and to keep a tension of the ink ribbon passing through the printer constant.

2. The printer apparatus according to claim 1, wherein the first driver is a DC motor that can change the torque by changing a current value applied to the first driver.

3. The printer apparatus according to claim 2, wherein the first adjuster is configured to adjust a current value applied to the DC motor based on the diameter of the collection side roll calculated by the detector.

4. The printer apparatus according to claim 1, further comprising:

a second driver configured to rotate the conveyance roller in the direction of winding the ink ribbon; and a torque limiter that is provided between the second driver and the conveyance roller.

5. The printer apparatus according to claim 4, wherein the second driver is a stepping motor.

6. The printer apparatus according to claim 1, further comprising:

a second adjuster configured to adjust a friction force between the conveyance roller and the ink ribbon.

7. The printer apparatus according to claim 6, wherein the second adjuster is configured to adjust an amount of the ink ribbon wound around the conveyance roller.

8. The printer apparatus according to claim 1, wherein the first driver is configured to rotate the feeding roller in synchronization with the winding roller.

9. The printer apparatus according to claim 1, further comprising:

a conveyor configured to convey the printed medium through the printer.

10. A printing method comprising:

providing a feed side roll including an ink ribbon wound around a feeding roller;

rotating, by a first driver, to wind an ink ribbon from the feed side roll around a winding roller to form a collection roll;

detecting, by a detector, a change in a tension of the ink ribbon;

printing, by a printer, on a print medium via the ink ribbon stretching in a tense state between the collection side roll and the feed side roll;

winding, by a conveyance roller, the ink ribbon between the collection side roll and the feed side roll;

adjusting, by an adjuster, a torque for rotating the winding roller by the first driver based on detection results in the detector to keep a tension of the ink ribbon passing through the printer constant;

rotating a holding member a first direction; and swinging a winding rod in the first direction to press an amount of a surface of the ink ribbon to the winding rod.

11. The printing method according to claim 10, wherein the winding rod is positioned between the conveyance roller and the collection side sandwiching the ink ribbon therebetween.

12. The printing method according to claim 10, wherein swinging the winding rod in the first direction increases the amount of the surface of the ink ribbon wound around the conveyance roller.

13. The printing method according to claim 10, wherein adjusting the torque further comprises:

rotating the holding member a second direction; and swinging the winding rod in the second direction to press the amount of the surface of the ink ribbon to the winding rod.

14. The printing method according to claim 13, wherein swinging the winding rod in the second direction decreases the amount of the surface of the ink ribbon wound around the conveyance roller.

15. The printing method according to claim 14, wherein the second direction is opposite the first direction.

16. The printing method according to claim 10, further comprising:

changing the torque by changing a current value applied to the first driver, wherein the first driver is a DC motor.

17. The printing method according to claim 16, further comprising:

detecting, by a senser of the detector, rotational speed of the winding roller; and calculating, by the detector, a diameter of the collection side roll based on the rotational speed detected by the sensor.

18. The printing method according to claim 17, wherein the first adjuster is configured to adjust a current value applied to the DC motor based on the diameter of the collection side roll calculated by the detector.

* * * * *